Patented May 23, 1933

1,909,935

UNITED STATES PATENT OFFICE

CAMILLE DREYFUS, OF NEW YORK, N. Y.

COATING COMPOSITION CONTAINING CELLULOSE ETHERS AND FILM PRODUCED THEREBY

No Drawing.   Application filed April 18, 1928. Serial No. 271,114.

This invention relates to the preparation of coating composition containing cellulose ethers that have low viscosity characteristics and to films produced from such coating compositions.

An object of my invention is to produce coating compositions or lacquers containing cellulose ethers of low viscosity characteristics. Other objects of my invention will appear from the following detailed description.

One of the essential requirements of a lacquer or varnish containing derivatives of cellulose as the lacquer base is that such lacquer contains a large percentage of cellulose derivative, and still be of such low viscosity that it may be readily sprayed, brushed or otherwise applied to the surface to be coated and that the films produced from such lacquer be tough and water resistant. To satisfy these requirements, the cellulose derivatives to be used as a lacquer base should have such viscosity characteristics that a comparatively concentrated solution of the cellulose derivatives in the solvents used as the vehicle in the lacquer, is of comparatively low viscosity.

I have found that cellulose ethers of low viscosity characteristics are eminently suited for the preparation of lacquer to be used for the coating of metals, wood, ceramic material, etc.

In accordance with my invention, I prepare a lacquer containing cellulose ethers of low viscosity and a volatile solvent therefor. The lacquer may also contain, if desired, medium and/or high boiling solvents, plastifiers or softening agents, and resins either natural or synthetic, or both.

Any suitable cellulose ethers of the required low viscosity characteristics may be employed. Examples of such cellulose ethers are methyl cellulose, ethyl cellulose or benzyl cellulose. The cellulose ethers should be of low viscosity characteristics and should preferably have a viscosity of 0.1 to 5.0 as determined by measuring the viscosity of a solution containing 6 grams of cellulose ether in 100 grams of a solvent, such as benzene, in an Ostwald viscosimeter, the viscosity of glycerine being called 100.

Any suitable volatile solvent may be employed in the preparation of the lacquer. Among solvents that may be mentioned are benzene, toluene, ether, alcohol (ethyl, methyl or denatured) acetone, chloroform, etc. Only one of the above mentioned solvents may be used or mixtures of two or more of these solvents may be employed.

If desired, medium and/or high boiling solvents such as ethyl acetate, amyl acetate, butyl acetate may be added to the coating composition.

Where softness of the films produced from the lacquer is desired, suitable plastifiers or softeners may be used. Examples of such softeners or plastifiers are triphenyl phosphate, tricresyl phosphate, diethyl phthalate, dibutyl tartrate, triacetin, thiocarbanilid, and amides or sulfonamides such as monomethyl toluene sulfonamide. Any one or a mixture of two or more of these softeners can be used.

When it is desired to impart to the lacquer the property of producing films that adhere more firmly to smooth surfaces, resins or gums may be added to the lacquer. The resins used may be either natural or synthetic or both. Examples of natural resins are manila, accaroides, pontianak, kauri, dammar, copals, rosin or shellac. Examples of synthetic resins are phenol-aldehyde resins (preferably made in the presence of an acid catalyst) diphenylol propane aldehyde resins, diphenylol propane ketone resins, phenol furfural resins, aniline furfural resins, acetone furfural resins, etc. If desired a semi-synthetic resin such as ester gum (glycerol ester of rosin) may be used.

Filling materials, effect materials, pigments, dyes, stabilizers and anti acids such as urea, calcium lactate, etc. may be added to the coating composition in any desired amounts as is well understood in the art, if the effects produced by such materials are desired in the product formed from the coating composition.

The films produced from the coating composition are tough, water resistant, and stick well to smooth surfaces such as metallic surfaces. The coating composition may be employed for producing films that are suitable for use for photographic purposes.

In order to further illustrate my invention, the following detailed description of a coating composition made in accordance therewith is given.

Example

A coating composition is made having the following non volatile constituents.

| | Parts |
|---|---|
| Ethyl cellulose (of a viscosity of 1.0) | 10 to 15 |
| Resin or gum | 10 |
| Softener or plastifier | 1 to 3 |

The resin or gum may be ester gum or a phenol-aldehyde resin prepared in the presence of an acid catalyst. The softener may be diethyl phthalate. 20 parts of the above non volatile constituents are dissolved in 100 parts of a solvent that may be made up as follows:

| | Parts |
|---|---|
| Ethyl acetone | 67 |
| Acetone | 22 |
| Toluene | 11 |

It is to be understood that the foregoing detailed description is given merely by way of illustration and that many variations may be made therein without departing from the spirit of this invention.

Having described my invention, what I claim and desire to secure by Letters Patent is:

A coating composition containing as the sole cellulose derivative constituent a cellulose ether having a viscosity characteristic below 5, a plastifier, a resin and a volatile solvent therefor.

In testimony whereof, I have hereunto subscribed my name.

CAMILLE DREYFUS.